US008132230B2

(12) United States Patent
Akita

(10) Patent No.: US 8,132,230 B2
(45) Date of Patent: Mar. 6, 2012

(54) IMAGE PROCESSOR

(75) Inventor: Katsuhiko Akita, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 917 days.

(21) Appl. No.: 11/023,572

(22) Filed: Dec. 29, 2004

(65) Prior Publication Data
US 2006/0101279 A1 May 11, 2006

(30) Foreign Application Priority Data

Nov. 9, 2004 (JP) ................................. 2004-325354

(51) Int. Cl.
G06F 7/04 (2006.01)
(52) U.S. Cl. ............ 726/2; 713/183; 713/184; 713/182; 713/178; 713/179; 713/185; 713/186; 705/72; 705/67; 726/4; 726/17; 726/27; 726/18; 726/28; 726/21; 726/29
(58) Field of Classification Search .......... 713/178–179, 713/183–184, 185, 186; 726/3–5, 2, 27, 726/18, 21, 17, 28, 29; 380/51, 243; 705/67, 705/72
See application file for complete search history.

(56) References Cited

U.S. PATENT DOCUMENTS

| 5,708,908 | A | * | 1/1998 | Hirata et al. ........................ 399/8 |
| 5,774,552 | A | * | 6/1998 | Grimmer ...................... 713/156 |
| 5,793,964 | A | | 8/1998 | Rogers et al. |
| 5,890,029 | A | * | 3/1999 | Hirata et al. ........................ 399/8 |
| 6,157,829 | A | * | 12/2000 | Grube et al. ............... 455/414.1 |
| 6,304,907 | B1 | | 10/2001 | Keronen et al. |
| 6,378,070 | B1 | * | 4/2002 | Chan et al. .................... 713/155 |
| 6,381,029 | B1 | * | 4/2002 | Tipirneni ..................... 358/1.14 |
| 6,542,261 | B1 | * | 4/2003 | McGraw ........................ 358/434 |
| 6,545,767 | B1 | * | 4/2003 | Kuroyanagi ................. 358/1.14 |
| 6,583,888 | B1 | | 6/2003 | Salgado et al. |
| 6,683,698 | B2 | | 1/2004 | Toyoda et al. |
| 6,798,533 | B2 | * | 9/2004 | Tipirneni ..................... 358/1.15 |
| 7,178,169 | B1 | * | 2/2007 | Salmonsen et al. ............. 726/31 |

(Continued)

FOREIGN PATENT DOCUMENTS

GB 2379040 * 2/2003

(Continued)

OTHER PUBLICATIONS http://en.wikipedia.org/wiki/SecureID, the page was last modifed on Dec. 19, 2008.*

(Continued)

Primary Examiner — April Shan
(74) Attorney, Agent, or Firm — Morrison & Foerster LLP

(57) ABSTRACT

A procedure for login in a case where a prescribed job is executed in an image processor is simplified. An image processor includes: input unit accepting an input of user authentication information from a user; user authentication unit performing user authentication by comparing the inputted user authentication information with the stored user authentication information to authorize execution of processing; and temporary ID generation unit generating an temporary ID if the user authentication is successful to store the temporary ID, being related to the user authentication information, wherein the input unit accepts an input of the temporary ID and the user authentication unit compares the inputted temporary ID with the stored temporary ID to thereby perform the user authentication and to authorize execution of the processing.

20 Claims, 12 Drawing Sheets

U.S. PATENT DOCUMENTS

| | | | |
|---|---|---|---|
| 7,284,040 B2 * | 10/2007 | Kobayashi et al. | 709/219 |
| 7,689,832 B2 * | 3/2010 | Talmor et al. | 713/186 |
| 2002/0065848 A1 * | 5/2002 | Walker et al. | 707/511 |
| 2002/0068573 A1 * | 6/2002 | Raverdy et al. | 455/445 |
| 2002/0109859 A1 * | 8/2002 | Tipirneni | 358/1.15 |
| 2002/0120587 A1 * | 8/2002 | D'Agostino | 705/78 |
| 2003/0052912 A1 * | 3/2003 | Bowman et al. | 345/738 |
| 2003/0061520 A1 * | 3/2003 | Zellers et al. | 713/202 |
| 2003/0088782 A1 * | 5/2003 | Forrest | 713/186 |
| 2003/0135740 A1 * | 7/2003 | Talmor et al. | 713/186 |
| 2004/0192349 A1 * | 9/2004 | Reilly | 455/456.2 |
| 2004/0257608 A1 * | 12/2004 | Tipirneni | 358/1.15 |
| 2004/0268122 A1 * | 12/2004 | Satarasinghe et al. | 713/159 |
| 2005/0102499 A1 * | 5/2005 | Kosuga et al. | 713/152 |
| 2005/0123113 A1 * | 6/2005 | Horn | 379/199 |
| 2005/0210259 A1 * | 9/2005 | Richardson | 713/179 |
| 2005/0238174 A1 * | 10/2005 | Kreitzer | 380/277 |
| 2006/0036693 A1 * | 2/2006 | Hulten et al. | 709/206 |
| 2006/0087410 A1 * | 4/2006 | Garcia et al. | 340/309.16 |
| 2006/0218404 A1 * | 9/2006 | Ogura | 713/178 |
| 2007/0083931 A1 * | 4/2007 | Spiegel et al. | 726/24 |
| 2007/0172068 A1 * | 7/2007 | Herrmann | 380/278 |
| 2007/0214363 A1 * | 9/2007 | Ishii | 713/178 |
| 2008/0036572 A1 * | 2/2008 | Muller | 340/5.82 |

FOREIGN PATENT DOCUMENTS

| | | | |
|---|---|---|---|
| JP | 2000-010927 | | 1/2000 |
| JP | 2000-284937 | | 10/2000 |
| JP | 2002-082860 | | 3/2002 |
| JP | 2002-152195 | | 5/2002 |
| JP | 2003-228472 | | 8/2003 |
| JP | 2003-256373 | * | 9/2003 |
| JP | 2003-288189 | | 10/2003 |
| JP | 2003-323408 | | 11/2003 |
| JP | 2004-094920 | | 3/2004 |
| JP | 2004-110561 | | 4/2004 |
| JP | 2005-011318 | | 1/2005 |

OTHER PUBLICATIONS http://www.rsa.com/node.aspx?id=1156, the page was retrieved on Dec. 30, 2008.* http://www1.ipdl.inpit.go.jp/RS1_E/cgi-bin/RS1P400.cgi/1101/ , Mar. 16, 2007.*

Japanese Office Action dated Nov. 14, 2006, directed at counterpart JP application No. 2004-325354.

* cited by examiner

IMAGE PROCESSOR

This application is based on Japanese Patent Application No. 2004-325354 filed in Japan on Nov. 9, 2004, the contents of which are hereby incorporated by reference.

BACKGROUND OF THE INVENTION

1. Field of the Invention

This invention relates to an image processor authorizing various kinds of processing for an image by performing user authentication, and, for example, to an image processor capable of image processing through execution of jobs such as print processing and scan processing with a printer, an MFP or the like.

2. Description of the Related Art

Conventionally, execution of a prescribed job concerning a secrete matter has been authorized in a case where a user ID and a password are inputted by a user and user authentication performed based thereon is successful, each time when the job is to be executed. For example, there have been available a network device working so that user authentication information is regularly updated and issued to thereby prevent the authentication information to be leaked (see, for example, Japanese Patent Laid-open Publication No. 2003-288189). There have been available an image forming and reading system in which at the time of authentication when accumulation printing or secret printing is performed, user authentication is performed by causing a scanner to read a user ID and a password that is printed in advance, thereby alleviating time and load required therefor on a panel (see, for example, Japanese Patent Laid-open Publication No. 2003-228472). There have been available an information processor in which, in a terminal which issues a print job to a printer and receives a job ID from the printer, the job ID is written on a card and a user inserts the card into the printer to thereby start the job (see, for example, Japanese Patent Laid-open Publication No. 2004-94920).

There has been a requirement, however, for a user to acquire authentication by inputting a user ID and a password each time a prescribed job is executed in an image processor and an input procedure therefor is cumbersome. There has been a scene where a user login on a network to command execution of a job such as accumulation printing or secret printing and thereafter, operates a console panel of the image processor by himself or herself to thereby cause it to perform printing-out, wherein even in a state where the image processor is connected to the network, it is necessary for the user to login to the image processor and the user has to input a user ID and a password to the image processor in each login thereto to thereby acquire authentication, which renders the procedure complicated.

SUMMARY OF THE INVENTION

It is accordingly an object of the invention to simplify a procedure for login in execution of a prescribed job in an image processor.

An image processor concerning the invention includes:
an input unit accepting an input of user authentication information from a user;
a user authentication unit performing user authentication by comparing the inputted user authentication information with the stored user authentication information to authorize execution of processing; and
a temporary ID generation unit generating a temporary ID in a case where the user authentication is successful to store the temporary ID, being related to the user authentication information, wherein
the input unit accepts an input of the temporary ID and the user authentication unit compares the inputted temporary ID with the stored temporary ID to thereby perform the user authentication and to authorize execution of the processing.

An image processor concerning the invention, in a case where the user authentication with a user ID and a password is successful, generates a temporary ID and stores it being related to the user ID. In the situation, since the user can login only by inputting the generated temporary ID, a login procedure can be simplified.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE PREFERRED EMBODIMENTS

Description will be given of image processors concerning embodiments of the invention using the accompanying drawing. Note that in all of the figures, the same symbols are attached to substantially the same constituents.

First Embodiment

Figure 1:
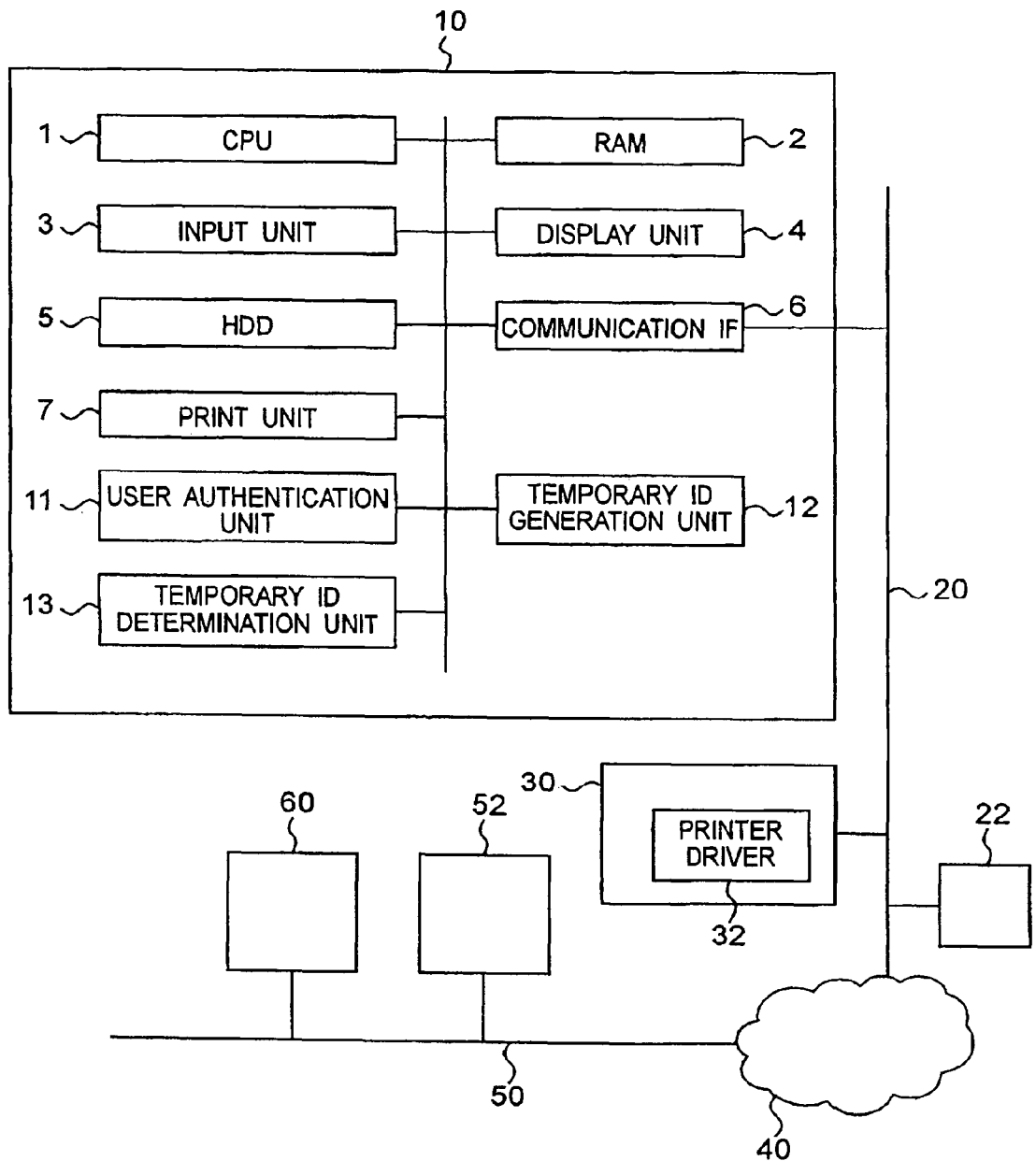
FIG. 1 is a block diagram showing a configuration of a system including an image processor concerning a first embodiment of the invention.

FIG. 1 is a block diagram showing a configuration of a network including a construction of an image processor 10 concerning the first embodiment. The image processor 10 is connected to a network 20. The network 20 is, in turn, connected to a wide area network, for example another network 50, through the internet 40. A mail server 22 and a terminal A30 are connected to the network 20 in addition to the image processor 10. A mail server 52 and a terminal B60 are connected to the network 50. The networks 20 and 50 are of one of LANs, for example, the Ethernet (registered trademark), the token ring and FDDI (Fiber Distributed Data Interface) and others. The user can login not only by inputting user information directly to the image processor 10, but also to the image processor 10 through the network 20 from the terminal A30. The user can also login to the image processor 10 from the terminal B60 through the network 50, the internet 40 and the network 20. The user login to the image processor 10 to thereby enable various kinds of processing such as printing, scanning, secret printing and others to be executed. Description will be given of the embodiment using a print job (hereinafter referred to as simply a job for short) as an example and no specific limitation is placed on the print job. Note that no specific limitation is placed on kinds of equipment connected to the networks 20 and 50 and the number of the equipment pieces shown in FIG. 1. The terminal A30 is equipped with a printer driver 32, which will be detailed in a fifth embodiment.

Figure 2:
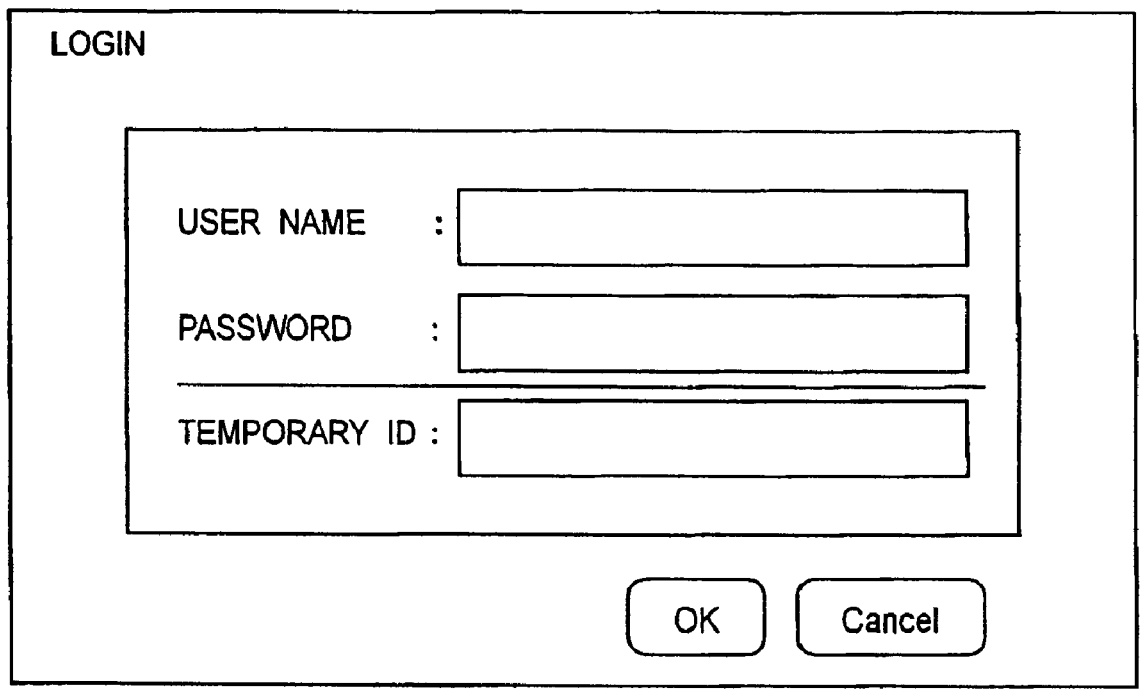
FIG. 2 is an example of a login screen image for the image processor.

The image processor 10 is provided with CPU 1, RAM 2, an input unit 3, a display unit 4, a HDD 5, a communication interface 6, a print unit 7, a user authentication unit 11, a temporary ID generation unit 12 and a temporary ID determination unit 13. CPU 1 performs execution of a program or arithmetic, control of units and others. RAM 2 stores various kinds of data such as a program and an image data and is used as a working area into which data is temporarily stored in order to execute various kinds of processing. The input unit 3 is a touch panel, a keyboard, a mouse or the like and accepts inputs such as a user ID, a password and a temporary ID from a user. For example, inputs are accepted by an input screen image as shown in FIG. 2. The display unit 4 is a panel and presents a generated temporary ID thereon. HDD 5 is a hard disk drive and stores user authentication information used in user authentication. The image processor 10 is connected to the network 20 through the communication interface 6. The user authentication unit 11 compares user authentication information such as a user ID, a password and a temporary ID, all being inputted, with stored user authentication information to thereby perform user authentication. The temporary ID generation unit 12 generates a temporary ID in a case where user authentication using the user ID and the password is successful to store the temporary ID being related to user authentication information including the user ID and the password. The temporary ID determination unit 13 determines effectiveness of the temporary ID. In the image processor 10, in a case where user authentication with a user ID and a password is successful, login can be performed only with the generated temporary ID; therefore, a procedure for login is simplified.

Figure 3:
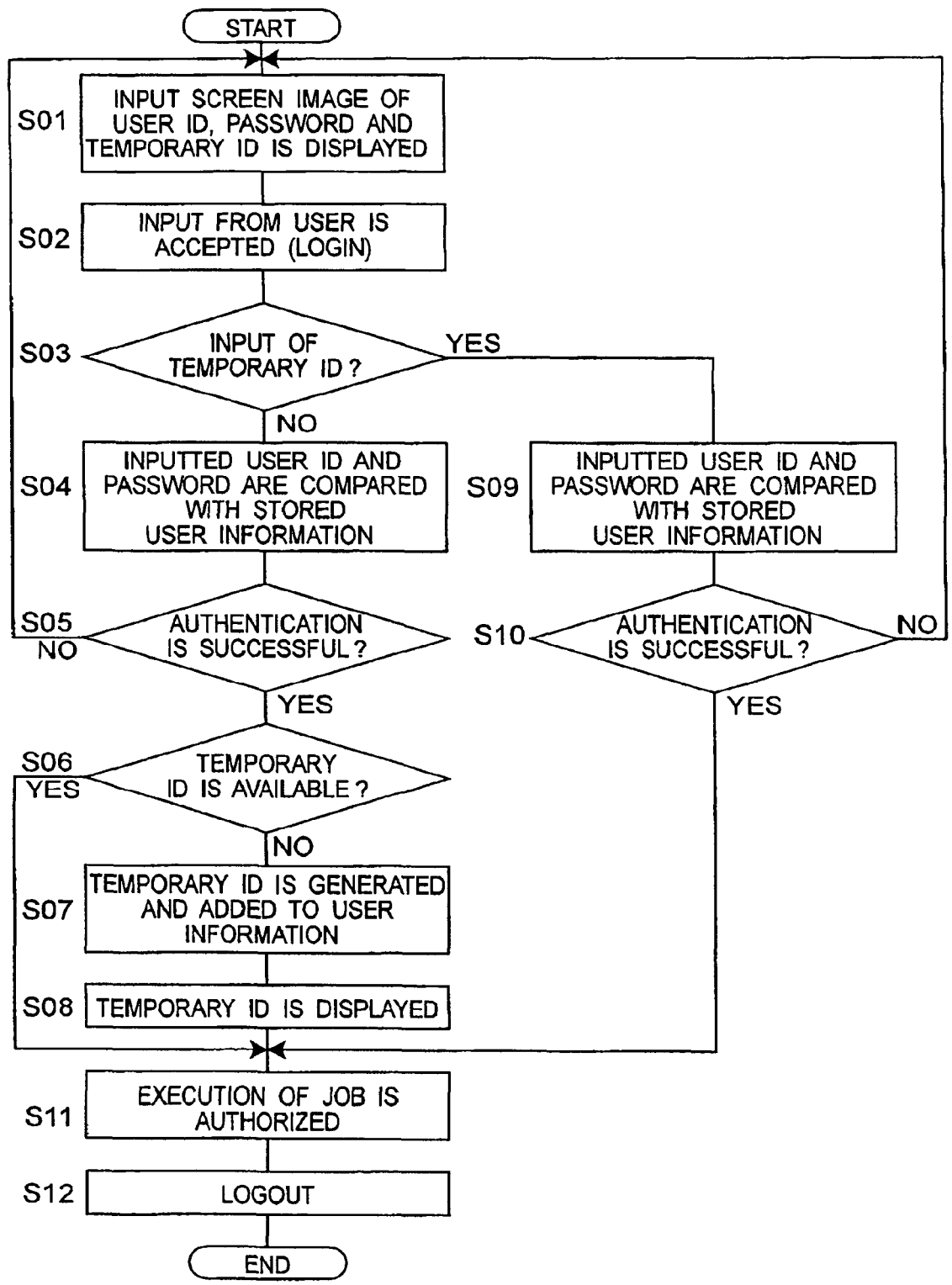
FIG. 3 is a flowchart of an image processing method for the image processor concerning a first embodiment of the invention.

FIG. 3 is a flowchart showing an image processing method for the image processor. Description will be given of the image processing method below.

Description will be given, first of all, of a case where a user having no temporary ID login for the first time.

(a) An input screen image of user authentication information such as a user ID and a password; and a temporary ID is, as shown in FIG. 2, presented on the display unit 4 (S01).

(b) An input from a user is accepted by the input unit 3 (login) (S02). In this case, since the user does not have a temporary ID, the user inputs the user ID and the password.

(c) It is determined whether or not the input is of the temporary ID (S03). In this situation, since the user has inputted the user ID and the password, the input is not of the temporary ID (N) and the process advances to step S04. Note that if the temporary ID has been inputted (Y), the process advances to step S09 as described later.

(d) The user ID and the pass word, both being inputted, are compared with the user ID and the password of the user authenticate information stored in HDD 5, in the user authentication unit 11 (S04).

(e) It is determined whether or not authentication is successful (S05). To be concrete, if coincidence occurs at least partly between the user ID and the password, both being inputted, and the user ID and the password, both being stored, authentication is successful and the process advances to S06, while if no coincidence occurs altogether, authentication fails and the process returns to step S01 where an input screen image is displayed.

(f) In a case where the authentication is successful, it is determined whether or not a temporary ID related to the user ID is available (S06). If a temporary ID related to the user ID is available already, the process advances to step S11, while if a temporary ID related to the user ID is not available, the process returns to step S07.

(g) A temporary ID is generated in the temporary ID generation unit 12 and the temporary ID is, as shown in Table 1, added to user authentication information being related to the user ID (S07). User authentication information is stored, as shown in Table 1, relating a user ID, a password and a temporary ID to one another. In the example shown in Table 1, a user A and a user C have received issuance of temporary IDs. On the other hand, a user B has not received issuance of a temporary ID.

(h) The temporary ID is presented on the display unit 4 (S08).

(i) Execution of the job is authorized (S11). Thereby, the user can execute the job such as printing or scanning.

(j) Thereafter, the user logout to end use of the image processor (S12).

TABLE 1

| Names of users | User IDs | Passwords | Temporary IDs |
|---|---|---|---|
| User A | ID001 | AAA | 001 |
| User B | ID002 | BBB | None |
| User C | ID003 | CCC | 002 |

Description will be given of a procedure in step S09 and thereafter of a case where a user having a temporary ID inputs the temporary ID instead of a user ID and a password and the temporary ID is inputted in step S03.

(a) The inputted temporary ID is compared with the stored user authentication information in the user authentication unit 11 (S09).

(b) It is determined whether or not authentication is successful (S10). To be concrete, if coincidence occurs between the inputted temporary ID and the stored temporary ID, authentication is successful and the process advances to S11, while if no coincidence occurs altogether, authentication fails and the process returns to step S01, where the input screen is displayed.

(c) Execution of a job is authorized (S11). Thereby, the user can execute the job such as printing or scanning.

(d) Thereafter, the user logout to end use of the image processor (S12).

According to an image processing method in the image processor, in a case where user authentication using a user ID and a password is successful, the user can login only by inputting the generated temporary ID; therefore, a procedure for login can be simplified. Note that the image processing method can be constructed as a computer-executable image processing program. The image processing program may be stored in a computer-readable recording medium.

Second Embodiment

Figure 4:
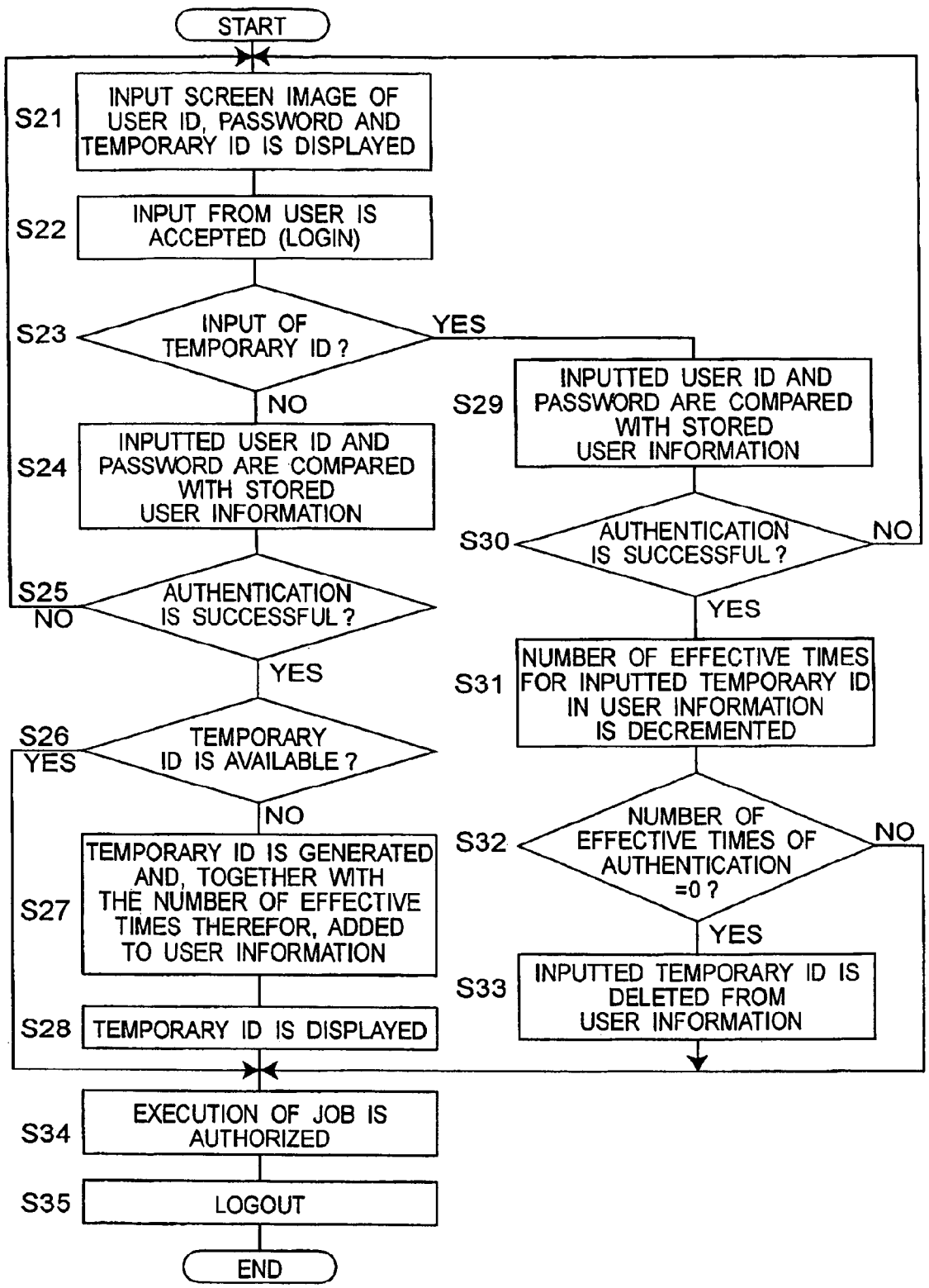
FIG. 4 is a flowchart of an image processing method for an image processor concerning a second embodiment of the invention.

FIG. 4 is a flowchart of an image processing method in an image processor concerning the second embodiment of the invention. The image processing method in the second embodiment is different from the image processing method in the first embodiment by comparison in that, in the former method, a generated temporary ID is stored being related to the number of effective times. In the image processing method, a limitation is imposed on the number of times of authentication with a generated temporary ID as shown in Table 2 (limiting to once for the user A and thrice for the user C) and if the number of times of authentication exceeds a set number of effective times, the temporary ID, when exceeding the set number of effective times, is invalidated and deleted from the user authentication information. Thereby, an illegal use of a temporary ID due to leakage of the temporary ID is prevented from occurring.

TABLE 2

| Names of users | User IDs | Passwords | Temporary IDs | Number of effective times |
|---|---|---|---|---|
| User A | ID001 | AAA | 001 | 1 |
| User B | ID002 | BBB | None | — |
| User C | ID003 | CCC | 002 | 3 |

Description will be given only of a difference of the image processing method concerning the second embodiment from the image processing method concerning the first embodiment using FIG. 4. Substantially the same steps as in FIG. 3 will be omitted in the description.

In the image processing method, a temporary ID is generated in the temporary generation unit 12, and the temporary ID and the number of effective times therefor are added to user authentication information being related to the user ID (S27), which is dissimilar to an operation in step S07 of FIG. 3.

Then, description will be given of a procedure for limiting the number of times of authentication for a temporary ID with the set number of effective times in a case where a temporary ID is inputted.

(a) The inputted temporary ID is compared with the stored user authentication information in the user authentication unit 11 (S29).

(b) It is determined whether or not authentication is successful (S30). In a case where the authentication is successful, the process advances to step S31, while in a case where the authentication fails, the process returns to step S21.

(c) The number of effective times for an inputted temporary ID in the user authentication information is decremented by 1 (S31).

(d) It is determined whether or not the number of effective times takes 0 (S32). If the number of effective times takes 0, the process advances to step S33, while the number of effective times is not 0, the process advances to S34.

(e) If the number of effective times is 0, the inputted temporary ID is deleted from the user authentication information (S33).

According to the image processing method, since a specific limitation is imposed on a number of times of authentication for temporary IDs, an illegal use of a temporary ID due to leakage can be prevented from occurring.

Third Embodiment

Figure 5:
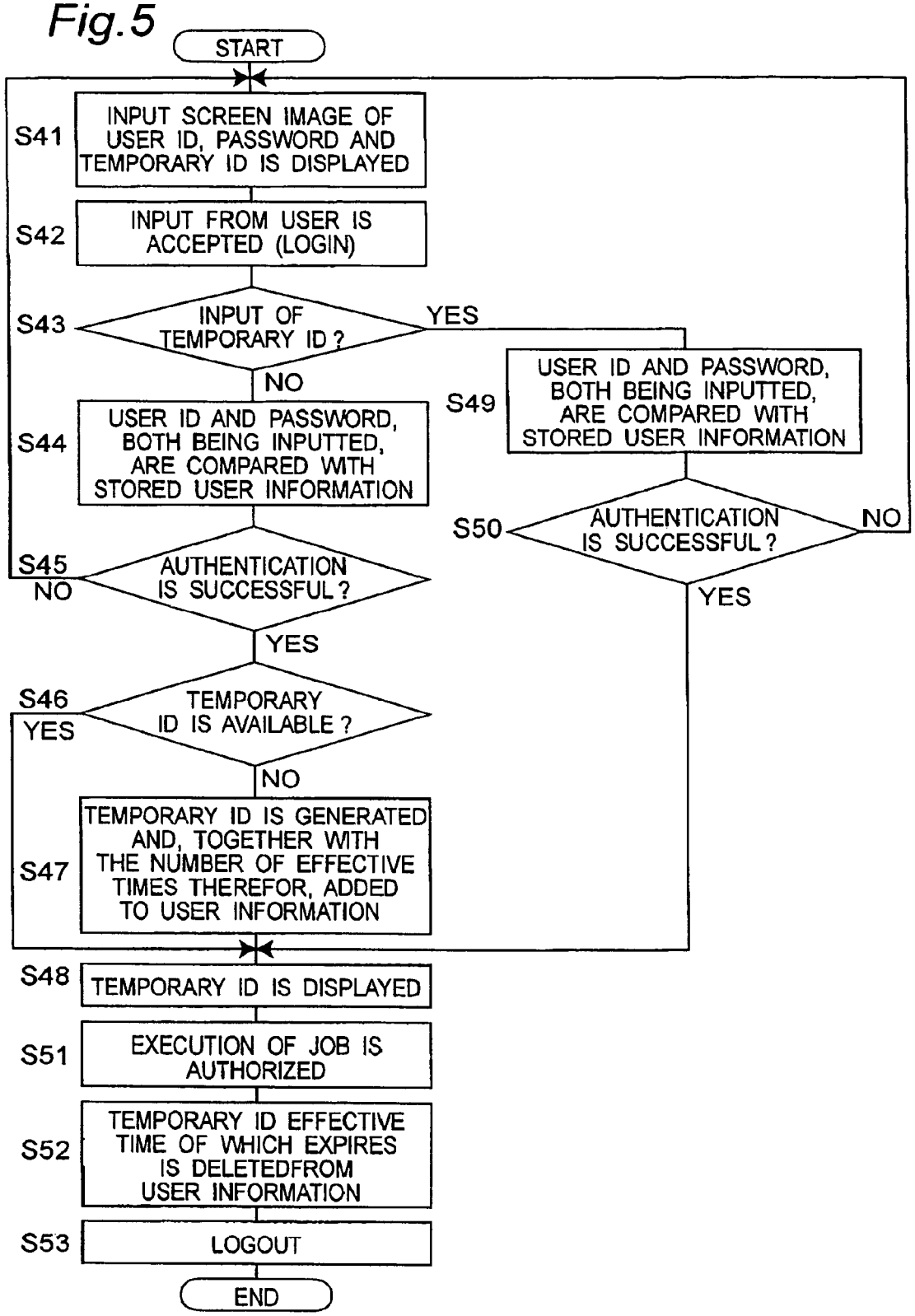
FIG. 5 is a flowchart of an image processing method for an image processor concerning a third embodiment of the invention.

FIG. 5 is a flowchart of an image processing method for an image processor concerning a third embodiment of the invention. The image processing method in the third embodiment is different from the image processing method in the first embodiment by comparison in that, in the former method, the effective time of a temporary ID is set. In the image processing method, the effective time of a temporary ID is set as shown in Table 3 (limiting to 2 days for the user A, 4 days for the user C) and a temporary ID the effective time of which expires is deleted. Thereby, an illegal use of a temporary ID due to leakage can be prevented from occurring.

TABLE 3

| Names of users | User IDs | Passwords | Temporary IDs | Effective time limits |
|---|---|---|---|---|
| User A | ID001 | AAA | 001 | 2 days |
| User B | ID002 | BBB | None | — |
| User C | ID003 | CCC | 002 | 4 days |

Description will be given only of a difference of the image processing method concerning the third embodiment from the image processing method concerning the first embodiment using FIG. 5. Substantially the same steps as in FIG. 3 will be omitted in the description.

In the image processing method, a temporary ID is generated in the temporary ID generation unit 12, and the temporary ID and the effective time thereof are added to user authentication information, being related to a user ID (S47). A temporary ID, the effective time of which expires, is deleted from the user authentication information by the temporary ID determination unit 13 (S52).

According to the image processing method, since the effective time of a temporary ID is set, an illegal use of a temporary ID due to leakage can be prevented from occurring.

Fourth Embodiment

Figure 6:
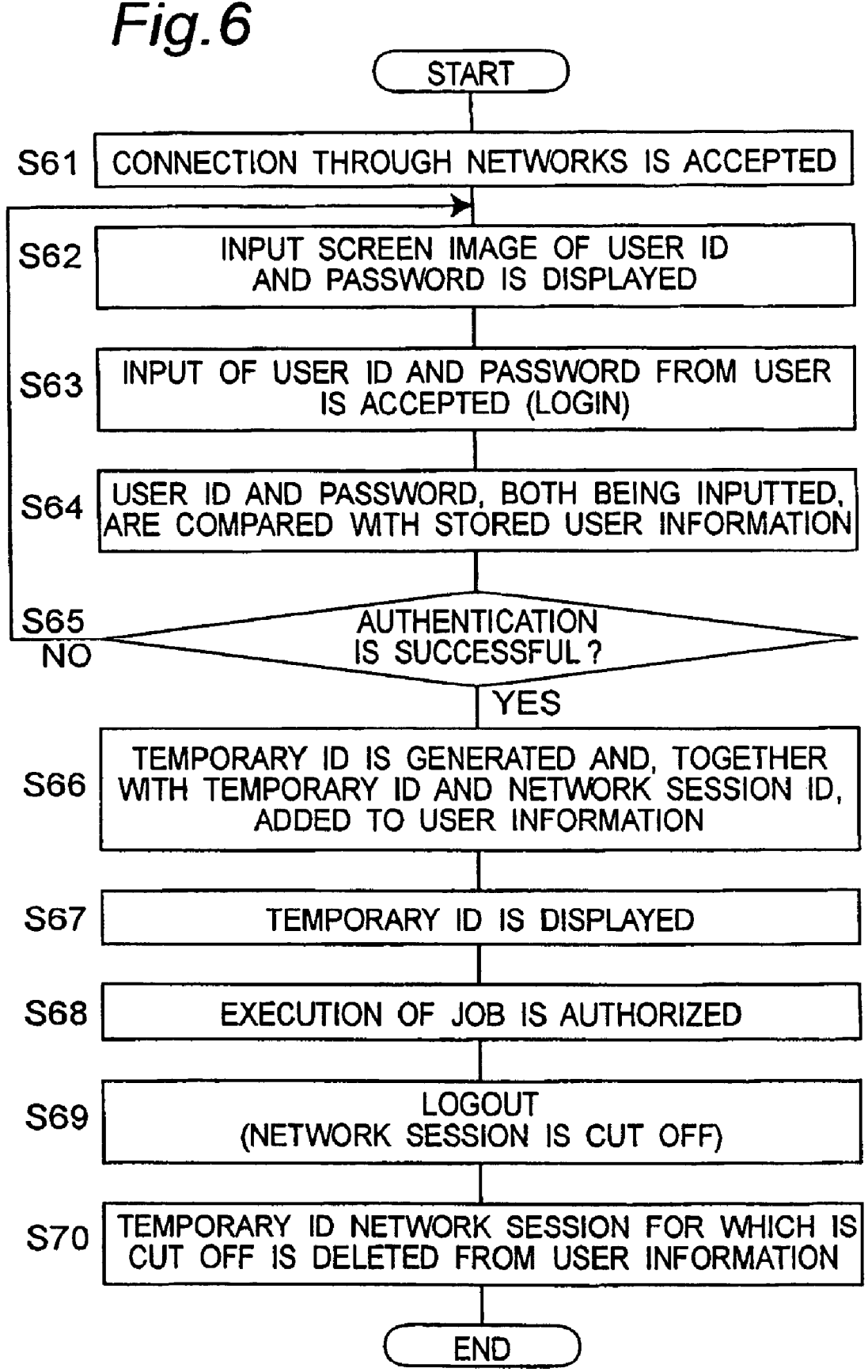
FIG. 6 is a first flowchart of an image processing method for an image processor concerning a fourth embodiment of the invention.

FIG. 6 is a flowchart of an image processing method in an image processor concerning a fourth embodiment of the invention. The image processing method concerning the fourth embodiment is different from the image processing method concerning the first embodiment by comparison in that, in the former method, login is performed by inputting user authentication information not directly to the image processor 10 proper but from the terminal 60 through the network 50, the internet 40 and the network 20 to the image processor 10. In this case, the image processor 10 handles a temporary ID as being effective only during the same time as a network session kept running on from login. Accordingly, as shown in Table 4, a network session ID specifically showing a network session after connection to the network is acquired and, together with the temporary ID, added to user authentication information. Thereafter, when the network session is cut off, the network session ID is invalidated, the temporary ID related to the network session ID is deleted from the user authentication information. Thereby, a simple and easy login procedure using a temporary ID can be used only during a network session kept running on after login. By permitting login with a temporary ID issued during a network session only during the network session kept running on, an illegal use of a temporary ID due to leakage can be prevented from occurring.

Description will be given only of a procedure from generation of a temporary ID to deletion thereof in a image processing method for the image processor using FIG. 6.

(a) Connection from the terminal 60 through the networks 50, 40, and 20 is accepted (S61).

(b) An input screen image of a user ID and a password is presented on the user's terminal 60 (S62).

(c) Inputs of the user ID and the password from a user is accepted (login) (S63).

(d) The user ID and the password, both being inputted, are compared with the stored user authentic information in the user authentication unit 11 (864).

(e) It is determined whether or not authentication is successful (S65). If the authentication is successful, the process advances to step S66, while the authentication fails, the process returns to step S61.

(f) A temporary ID is generated in the temporary ID generation unit 12 and the temporary ID and a network session ID are, as shown in Table 4, added to the user authentic information (S66). Note that the session IDs shown in Table 4 is not real ones but are shown conceptually. The user authentication information is stored, for example, so that the user ID, the password and the temporary ID are related to one another, as shown in Table 4.

(g) The temporary ID is displayed on the user's terminal 60 (S67).

(h) Execution of a job is authorized (S68). Thereby, the user can execute printing, scanning or the like.

(i) Thereafter, the user cuts off a network session and simultaneously logout from the image processor 10 (S69).

(j) The temporary ID determination unit 13 deletes the temporary ID from the user authentication information when the network session is disconnected (S70). This step is realized by detecting the network session ID that has been disconnected and invalidated to delete the corresponding temporary ID.

TABLE 4

| Names of users | User IDs | Passwords | Temporary IDs | Session IDs |
| --- | --- | --- | --- | --- |
| User A | ID001 | AAA | 001 | SE01 |
| User B | ID002 | BBB | None | — |
| User C | ID003 | CCC | 002 | SE02 |

Figure 7:
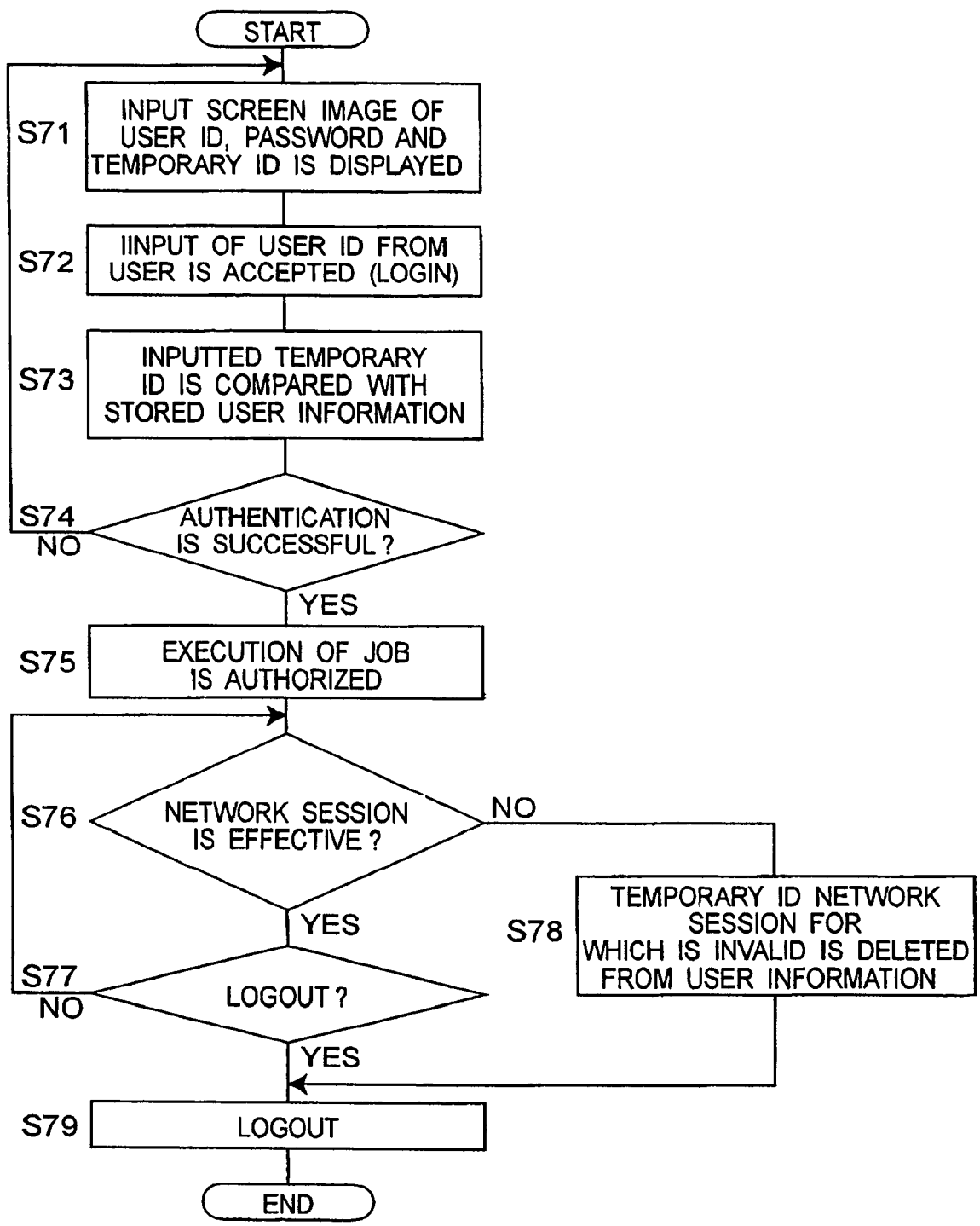
FIG. 7 is a second flowchart of the image processing method for an image processor concerning a fourth embodiment of the invention.

FIG. 7 is a flowchart of an image processing method in which user authentication is performed by inputting a temporary ID during a network session kept running on from connection to a network to thereby execute a job.

(a) An input screen image of a user ID, a password and a temporary ID is displayed on the user's terminal 60 (S71).

(b) An input of the temporary ID from the user is accepted (S72).

(c) The inputted temporary ID is compared with a temporary ID in the stored user authentication information (S73).

(d) It is determined whether or not authentication is successful (S74). If the authentication is successful, the process advances to step S75, while if the authentication fails, the process returns to step S71.

(e) Execution of a job is authorized (S75). Thereby, the user can execute the job such as printing or scanning.

(f) It is determined whether or not the network session is effective (S76). If connection to the network is disconnected, the network session is invalidated, that is the network session ID is invalidated and the process advances to step S78, while if connection to the network is kept running on, the network session ID is effective; therefore, the process advances to step S77.

(g) The temporary ID for which the network session is invalidated is deleted from the user authentication information (S78).

(h) It is determined whether or not logout is performed from the image processor 10 (S77). If logout is performed, the process advances to step S79, while if no logout is performed, the process returns to step S76.

(i) Thereafter, the use of the image processor ends by logout (S79). Note that the temporary ID can be logged-in for the second time during the period when the network session is effective.

With all the steps performed, a simple and easy login procedure with a temporary ID can be used only during the network session that is kept running on after connection to a network. An illegal use of a temporary ID can be prevented from occurring by permitting login with a temporary ID only during the network session that is kept running on.

Fifth Embodiment

Figure 8:
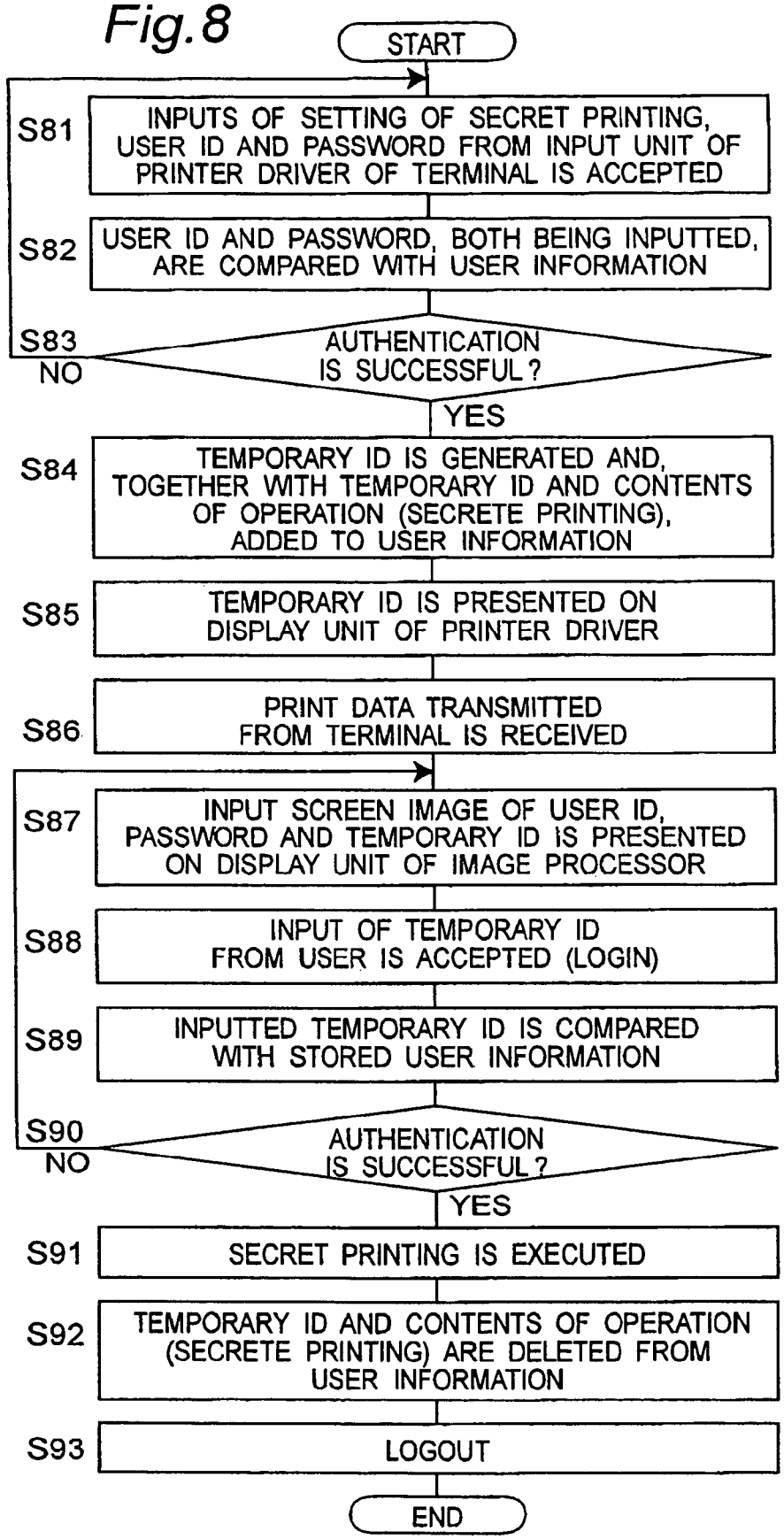
FIG. 8 is a flowchart of an image processing method for an image processor concerning a fifth embodiment of the invention.

FIG. 8 is a flowchart of an image processing method for an image processor concerning a fifth embodiment of the invention. The image processing method concerning the fifth embodiment is different from the image processing method concerning the first embodiment by comparison in that, in the former method, login is performed to the image processor 10 from the user's terminal 30, and not only is issuance of a temporary ID acquired by performing user authentication under limitation of the contents of a job on secrete printing, but, thereafter, login is also performed with the temporary ID in the image processor 10 proper to thereby execute secrete printing. With such a procedure adopted, after two times of login at terminals related to each other or one another about the job of secrete printing and in the image processor, user's authentication to come later can be performed by a simplified login with a temporary ID.

Description will be given of the image processing method, dividing it into two procedures: one for acquiring issuance of a temporary ID by login from the terminal 30 and the other for executing secrete printing by login with the temporary ID in the image processor 10 proper.

First of all, a user login to the image processor 10 through a network from the terminal 30.

(a) Inputs of setting of secrete printing, a user ID and a password from an input unit of the printer driver 32 of the terminal 30 are accepted (S81).

(b) The user ID and the password, both being inputted, are compared with the stored user authentication information in the user authentication unit 11(S32).

(c) It is determined whether or not authentication is successful (S83). If the authentication is successful, the process advances to step S84, while if the authentication fails, the process returns to step S81.

(d) A temporary ID is generated in the temporary ID generation unit 12 and, as shown in Table 5, the temporary ID and the contents of an operation (secret printing for the user A and printing hold for the user C) are added to the user authentication information (S84).

(e) The temporary ID is presented on the display unit of the printer driver 32 in the terminal 30 (S85).

(f) Print data transmitted from the terminal 30 is received (S86).

With the above steps adopted, issuance of a temporary ID for executing secrete printing is performed.

Then, the user moves to the image processor 10 from the terminal 30. In this step and steps subsequent thereto, the user operates the image processor 10 proper directly by himself or herself to thereby execute secrete printing.

(g) An input screen image of the user ID, the password and the temporary ID is presented on the display unit 4 of the image processor 10 (S87).

(h) An input of the temporary ID from the user is accepted (login) (S88).

(i) The inputted temporary ID is compared with the stored user authentication information in the user authentication unit 11 (S89).

(j) It is determined whether or not authentication is successful (S90). If the authentication is successful, the process advances to step S91, while the authentication fails, the process returns to step S87.

(k) Secrete printing is executed (S91).

(l) The temporary ID determination unit 13 deletes the temporary ID and the contents of an operation (secrete printing) from the user authentication information (S92). This is because, since the contents of the operation (a job) is limited to secrete printing, the temporary ID is invalidated by the end of the execution.

(m) Thereafter, logout is performed to end the process (S93).

TABLE 5

| Names of users | User IDs | Passwords | Temporary IDs | Contents of operations |
|---|---|---|---|---|
| User A | ID001 | AAA | 001 | Secrete printing |
| User B | ID002 | BBB | None | — |
| User C | ID003 | CCC | 002 | Print-hold |

Sixth Embodiment

Figure 9:
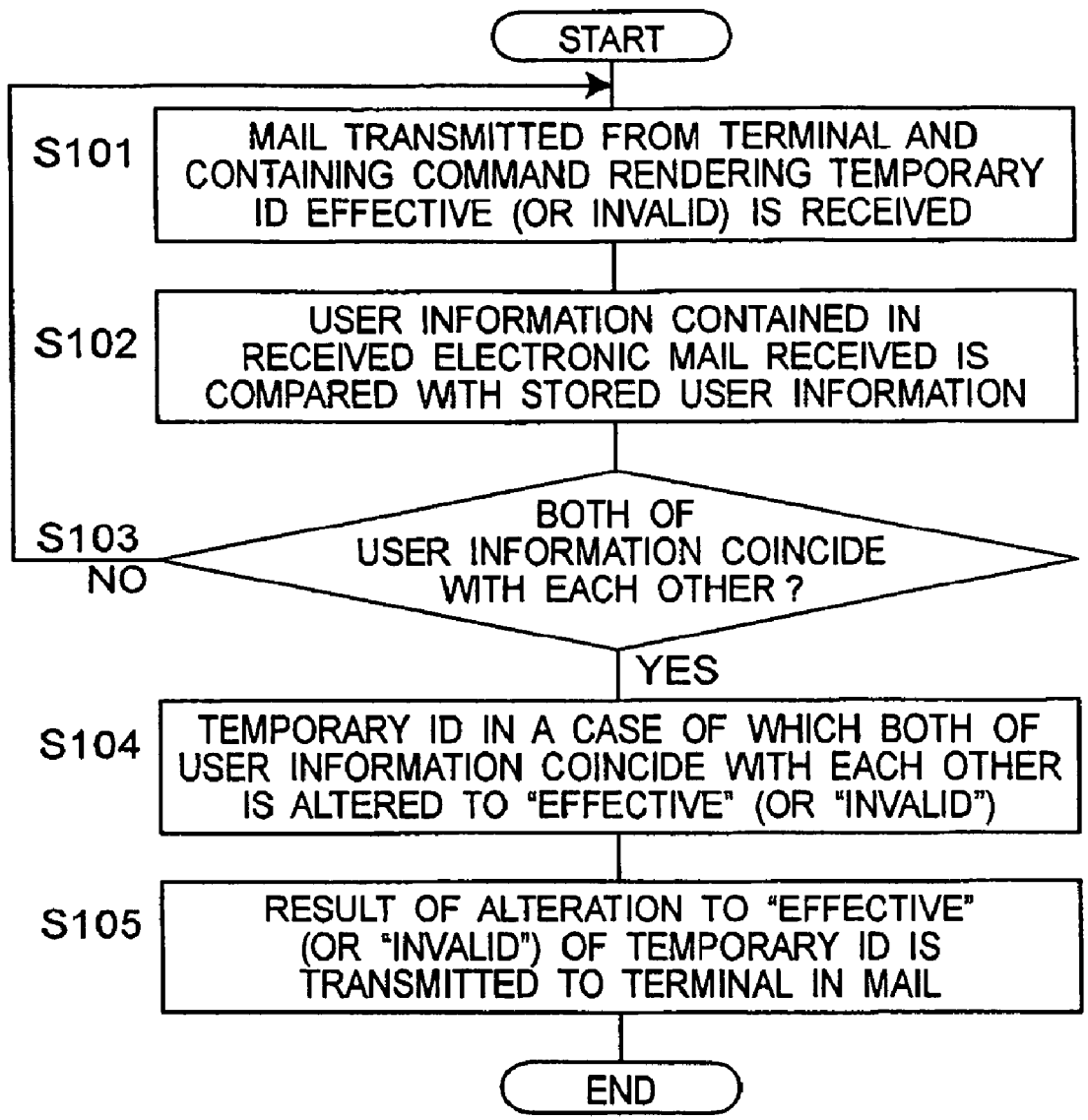
FIG. 9 is a flowchart of an image processing method for an image processor concerning a sixth embodiment of the invention.

FIG. 9 is a flowchart of an image processing method for an image processor concerning a sixth embodiment of the invention. The image processing method concerning the sixth embodiment is different from the image processing method concerning the first embodiment by comparison in that, in the former method, effectiveness of a temporary ID is altered by a command contained in an electronic mail. In the image processing method, as shown in Table 6, the attribute of the effectiveness of the temporary ID ("effective" or "invalid") is added to user authentication information together with the temporary ID (the user A is "invalid" and the user C is "effective"). Thereby, effectiveness of the temporary ID can be altered with an electronic mail any time when being necessary and login can be performed with the "effective" temporary ID. In a case where a temporary ID is not be used, the temporary ID is altered to "invalid" with an electronic mail, thereby enabling an illegal use of a temporary ID to be prevented.

Description will be given of a procedure for altering the effectiveness of a temporary ID with an electronic mail in the image processing method using FIG. 9.

(a) An electronic mail transmitted from the terminal 30 and containing a command that renders a temporary ID effective (or invalid) is received (S101). In this step, in a case where information that can be identified by a user specifically, for example a mail account, is managed for each of users in the image processor 10, the mail account can be used as information with which the user is identified. In this case, an electronic mail transmitted from a user has only to contain a temporary ID. On the other hand, in a case where the image processor 10 does not manage the mail account, user authentication information such as a user ID, a password and a temporary ID is transmitted in an electronic mail.

(b) The user authentication information contained in the received electronic mail is compared with the stored user authentication information in the user authentication unit 11 (S102).

(c) It is determined whether or not both of the user authentication information coincide with each other (S103). If both coincide with each other, the process advances to step S104, while if both does not coincide with each other, the process ends.

(d) The temporary ID in a case of which both of the user authentication information coincide with each other is altered to "effective" (or "invalid") (S104).

(e) The result of alteration to "effective" (or "invalid") of the temporary ID is transmitted to the terminal 30 in an electronic mail (S105). Data transmitted in this step is information of "effective" or "invalid," wherein no specific limitation is placed thereon and the data may also further include an effective time limit and others.

Note that, in the sixth embodiment, as a transmission method for a command that renders a temporary ID "effective" (or "invalid"), a method using an electronic mail is shown above, while a transmission method for a command is not specifically limited to an electronic mail. For example, a command is transmitted to the image processor 10 through a network from an external terminal and thereby, the temporary ID may be altered to be "effective" (or "invalid").

TABLE 6

| Names of user | User ID | Password | Temporary ID | "Effective"/"invalid" of temporary ID |
|---|---|---|---|---|
| User A | ID001 | AAA | 001 | "Invalid" |
| User B | ID002 | BBB | None | — |
| User C | ID003 | CCC | 002 | "Effective" |

Seventh Embodiment

Figure 10:
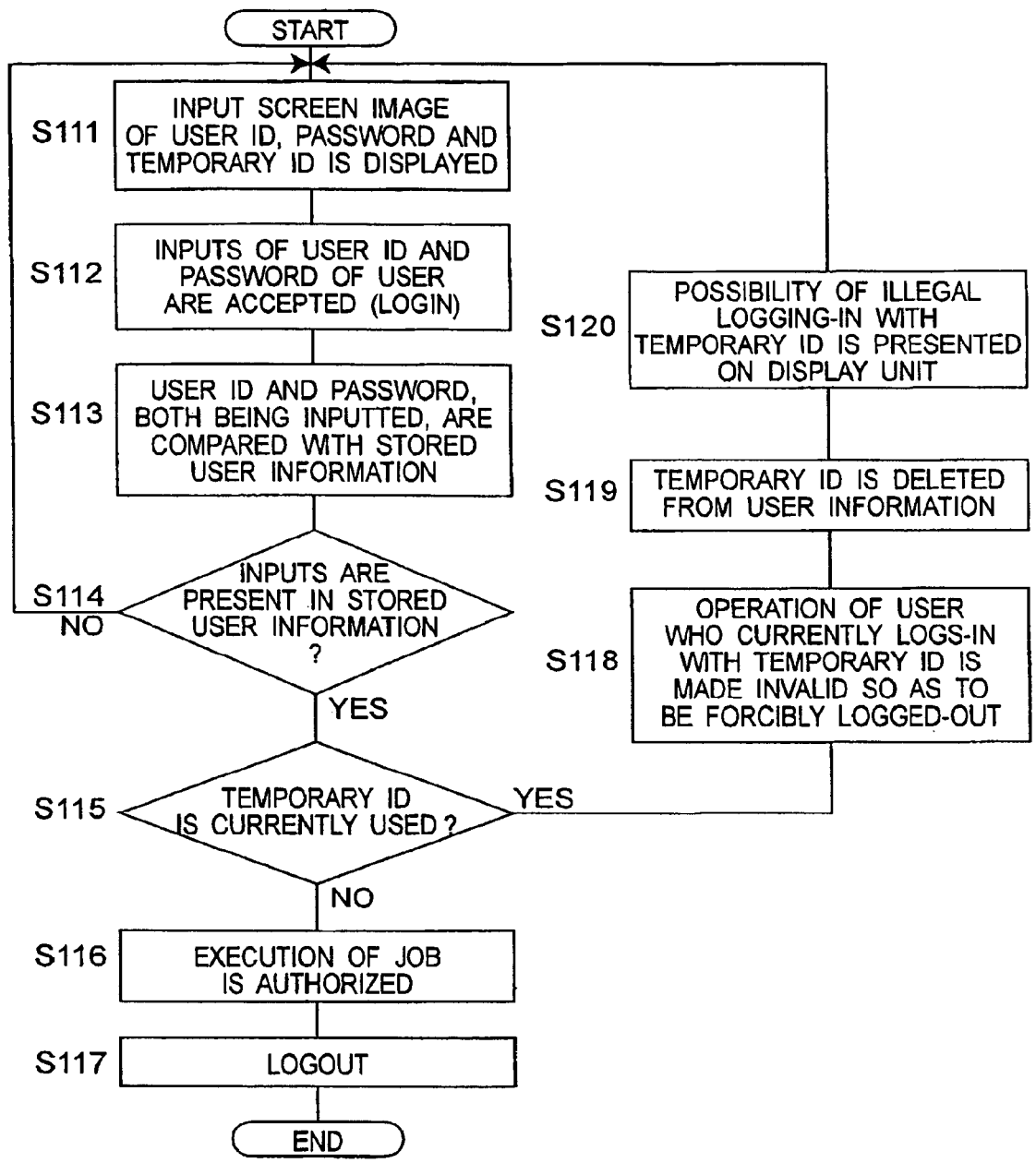
FIG. 10 is a flowchart of an image processing method for an image processor concerning a seventh embodiment of the invention.

FIG. 10 is a flowchart of an image processing method for an image processor concerning a seventh embodiment. The image processing method concerning the seventh embodiment is different from the image processing method concerning the first embodiment by comparison in that, in the former method, a stipulation is made about a case where a temporary ID of a user who login is used by a second user when login is performed. In this case, the use of the temporary ID by the second user is forcibly logged-out as an illegal use thereof to thereby delete the temporary ID. Thereby, an illegal use of a temporary ID can be permitted no longer, each time when an illegal use of the temporary ID is found.

Description will be given of the image processing method using FIG. 10.

(a) An input screen image of a user ID, a password and a temporary ID is presented on the display unit 4 (S111).

(b) Inputs of the user ID and a password of a user are accepted in the input unit 3 (login) (S112).

(c) Inputs of the user ID and the password, both being inputted, are compared with stored user authentication information in the user authentication unit 11 (S113).

(d) It is determined whether or not the inputs are present in the stored user authentication information (S114). If the inputs are present therein (authentication is successful), the process advances to step S115, while if the inputs are not present therein (the authentication fails), the process returns to step S111.

(e) Then, it is determined whether or not a temporary ID is currently used (S115). If the temporary ID is not currently used, the process advances to step S116, while if the temporary ID is currently used, the process advances to step S118. Note that the attribute of use/non-use of a temporary ID is, as shown in Table 7, stored in the user authentication information, which renders determination of use/non-use of a temporary ID easily performed.

(f) Execution of a job is authorized (S116).

(g) The user logout to end use of the image processor (S117).

(h) In a case where the temporary ID of a user who login is currently used by a second user, an operation of the second user who currently login with the temporary ID is made invalid so as to be forcibly logged-out (S118). In this case, while the user who login is a user who login with a user ID and a password thereof, the second user login with the temporary ID is inferred to be a user of an illegal use. Therefore, the second user is forcibly logged-out to thereby enable an illegal use to be prohibited immediately and thereafter.

(j) The temporary ID is deleted from the user authentication information (S119). By deleting the temporary ID that is illegally used, an illegal use can be permitted no longer.

(i) Possibility of illegal login with a temporary ID is presented on the display unit (S120).

TABLE 7

| Names of user | User ID | Password | Temporary ID | Use/non-use of temporary ID |
|---|---|---|---|---|
| User A | ID001 | AAA | 001 | Use |
| User B | ID002 | BBB | None | — |
| User C | ID003 | CCC | 002 | Non-use |

Figure 11:
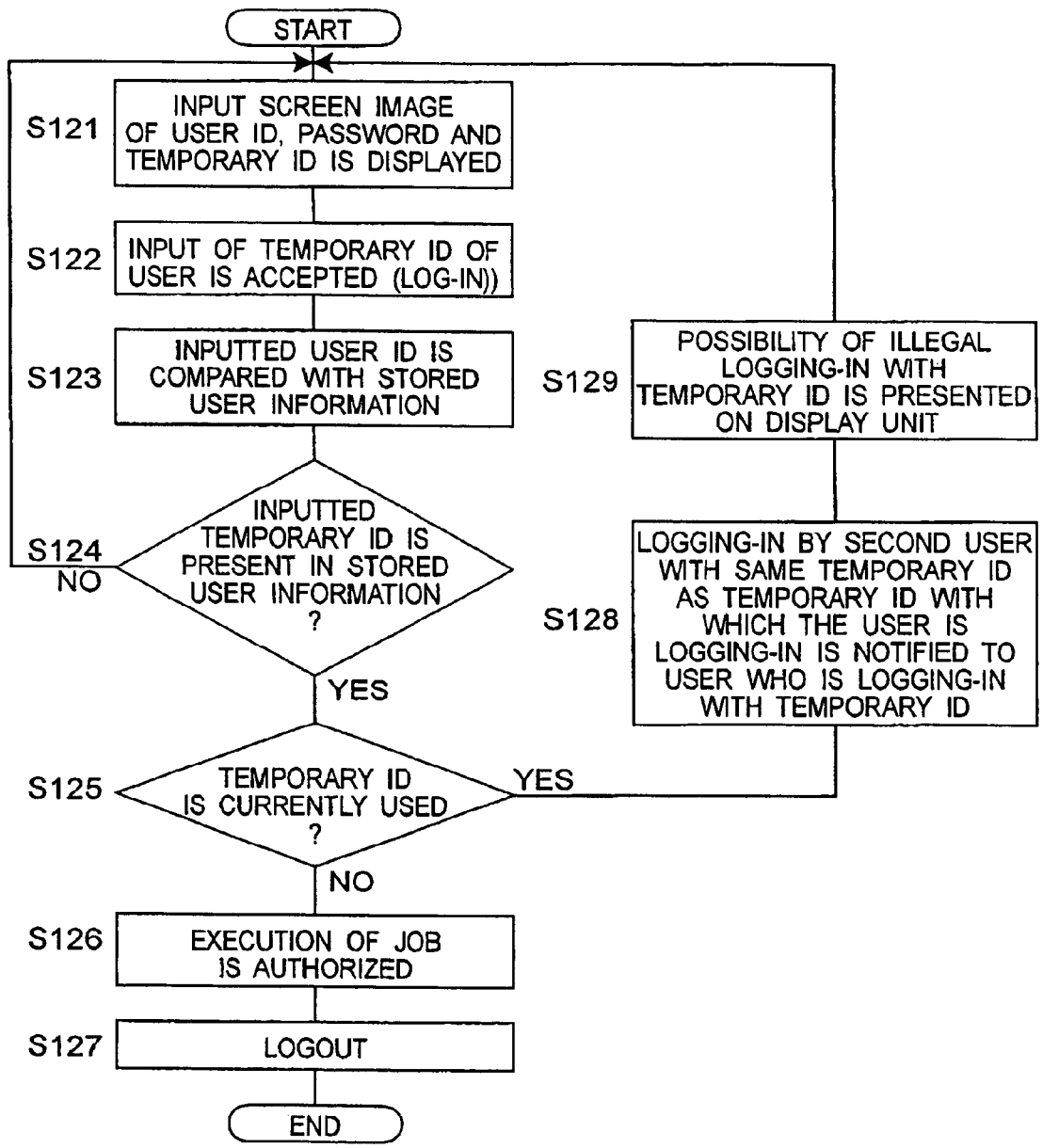
FIG. 11 is a flowchart of another example of the image processing method for an image processor concerning a seventh embodiment of the invention.

FIG. 11 is a flowchart showing handling of a temporary ID in a case where the temporary ID is being used already when login performed with the temporary ID in the image processing method.

(a) An input screen image of a user ID, a password and a temporary ID is presented on the display 4 (S121).

(b) An input of a temporary ID of a user is accepted in the input unit 3 (login) (S122).

(c) The inputted temporary ID is compared with stored authentication information in the user authentication unit 11 (S123).

(d) It is determined whether or not the inputted temporary ID is present in the stored user authentication information (S124). If the user ID is present therein (authentication is successful), the process advances to step S125, while if the user ID is not present therein (the authentication fails), the process returns to step S121.

(e) Then, it is determined whether or not the temporary ID is currently used (S125). If the temporary ID is not currently used, the process advances to step S126, while if the temporary ID is currently used, the process advances to step S128.

(f) Execution of a job is authorized (S126).

(g) The user logout to end use of the image processor (S127).

(h) Login by a second user with the same temporary ID as a temporary ID with which the user is login is notified to the user who is login with the temporary ID (S128). In this case, the two users login with the same temporary ID and it cannot be determined which of the two is a right user, which is dissimilar to a case where login is, as shown in FIG. 10, performed with a user ID and a password. Therefore, it is notified to each of the two users that the other user login with the same temporary ID.

(i) Possibility of illegal login with the temporary ID is presented on the display unit 4 (S129). Thereafter, the process returns to step S121.

In this case, a user who login with the same temporary ID later cannot be allowed for login. In a case of a right user, login is performed with a user ID and a password to thereby exclude a user of an illegal use according to the flowchart in FIG. 10.

Eighth Embodiment

Figure 12:
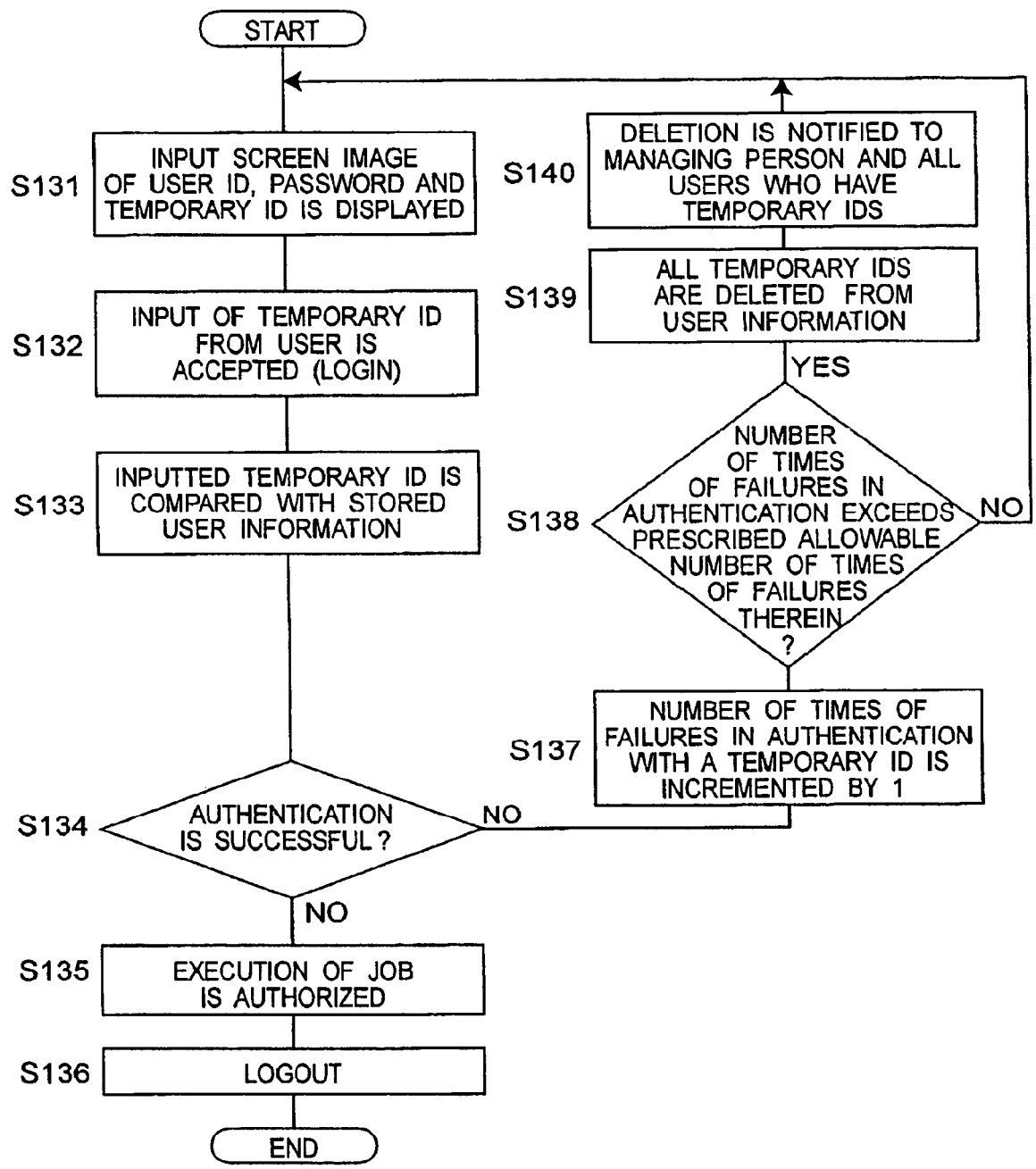
FIG. 12 is a flowchart of an image processing method for an image processor concerning an eighth embodiment of the invention.

FIG. 12 is a flowchart of an image processing method for an image processor concerning an eighth embodiment of the invention. The image processing method concerning the eighth embodiment is different from the image processing method concerning the first embodiment by comparison in that, in the former method, stipulation is given of processing in a case where the number of times of failures in user authentication with temporary IDs exceeds a prescribed allowable number of times thereof when login is performed. If the number of times of failures in user authentication with a temporary ID exceeds an allowable number of times of authentication, all temporary IDs are deleted in case attacks on the temporary IDs are performed as a round robin event. Thereby, an illegal use of a temporary ID can be prevented.

Description will be given of the image processing method using FIG. 12.

(a) An input screen image of a user ID, a password and a temporary ID is presented on the display unit 4 (S131).

(b) An input of a temporary ID from a user is accepted in the input unit 3 (login) (S132).

(c) The inputted temporary ID is compared with the stored user authentication information in the user authentication unit 11 (S133).

(d) It is determined whether or not authentication is successful (S134). If the authentication is successful, the process advances to step S135, while if the authentication fails, the process advances to step S137.

(e) Execution of a job is authorized (S135).

(f) Thereafter, the user logout to end use of the image processor (S136).

(g) On the other hand, if the authentication fails, the number of times of failures in authentication with a temporary ID is incremented by 1 (S137).

(h) It is determined whether or not the number of times of failures in authentication exceeds a prescribed allowable number of times of failures therein (S138). If the number of times of failures with temporary IDs exceeds the allowable number of times, the process advances to step S139, while if the number of times of failures in authentication with temporary IDs exceeds the allowable number of times, the process advances to step S139, while if the number of times of failures in authentication therewith, the process returns to step S131.

(i) All temporary IDs are deleted from the user authentication information (S139). In this case, it is assumed that attacks on the temporary IDs are performed as a round robin event. Note that the number of times of failures in authentication may be counted only in a case where failures occur in succession. In this case, new issuance of a temporary ID may be prohibited.

(j) Deletion of all the temporary IDs is notified to a managing person and the users who have the temporary IDs (S140). Thereafter, the process returns to step S131.

Note that the image processing methods described in the embodiments can be constructed as computer-executable image processing programs. The image processing programs may be stored in a computer-readable recording medium.

Note that while, in the eighth embodiment, an example of MFP is shown as an image processor, no specific limitation is placed thereon and the eighth embodiment can be applied even to a server such as a document management server or a document accumulation server.

While, in the eighth embodiment, there is shown the example in which login is performed through a network and a temporary ID generated in the case is inputted on a panel of an MFP, another procedure may also be adopted in which a temporary network generated in this step is inputted on a panel of the MFP and the generated temporary ID is inputted from a different device on the network to thereby perform authorization for execution of processing with the different device.

The invention can use an image processor authorizing execution of a job after user authentication.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image processor comprising:
   a memory; and
   a microprocessor-based control system configured to execute an image processing program stored in the memory to cause the image processor to:
   accept an input of user authentication information comprising a first type of login information to login a first user to the image processor,
   perform user authentication by comparing the inputted user authentication information with stored user authentication information to authorize a first use of the image processor,
   in response to the user authentication being successful, authorize the first use of the image processor, automatically generate a temporary ID comprising a second type of login information, notify the first user of the generated temporary ID and store the generated temporary ID as related to the stored user authentication information,
   accept a logout to end the first use of the image processor,
   after the generation of the temporary ID and the accepting of the logout to end the first use of the image processor, accept an input of the temporary ID, instead of said user authentication information comprising the first type of login information, to login the first user to the image processor,
   compare the inputted temporary ID with the stored temporary ID to thereby perform the user authentication and to authorize a second use of the image processor when the inputted temporary ID and the stored temporary ID match with each other, and
   determine that a second temporary ID, matching the stored temporary ID and previously inputted by a second user to login to the image processor, is invalid when the first user succeeds in user authentication based on the user authentication information comprising the first type of login information instead of the temporary ID, wherein the determination that the inputted second temporary ID is invalid causes use of the image processor by the second user to be stopped and the second user to be forcibly logged out.

2. The image processor according to claim 1, wherein the image processor is further configured to determine effectiveness of the inputted temporary ID.

3. The image processor according to claim 2, wherein the image processor,
   when generating the temporary ID and storing it, is configured to set the number of effective times for the generated temporary ID, wherein the number of effective times is stored into the user authentication information as related to the stored temporary ID, and
   when the number of times of authentication with the stored temporary ID exceeds the set number of effective times, is configured to render the stored temporary ID invalid, wherein the stored temporary ID is deleted from the stored user authentication information.

4. The image processor according to claim 2, wherein the image processor,
   when generating the temporary ID and storing it, is configured to set an effective time from when the temporary ID is generated, wherein the effective time is stored into the user authentication information as related to the stored temporary ID, and
   is configured to render the stored temporary ID the effective time of which expires invalid, wherein the stored temporary ID is deleted from the stored user authentication information.

5. The image processor according to claim 2, wherein the image processor
   is configured to accept an input of the user authentication information through a network,
   when generating the temporary ID and storing it, is configured to acquire a network session ID for an input through the network, wherein the network session ID is stored as related to the stored temporary ID into the user authentication information, and
   when the network session ID is rendered invalid, is configured to render the related temporary ID invalid for user authentication, wherein the stored temporary ID is deleted from the stored user authentication information.

6. The image processor according to claim 2, wherein the image processor,
   when generating the temporary ID and storing it, is configured to store an effectiveness showing a state of "effective" or "invalid" of the stored temporary ID being related to the stored temporary ID into the user authentication information, and
   is configured to store an alteration in effectiveness of the stored temporary ID based on a command received from a manager of the image processor commanding the alteration in effectiveness of the temporary ID.

7. The image processor according to claim 2, wherein the image processor is configured to determine if the second user is already logged in based on the second temporary ID matching the inputted temporary ID when the first user succeeds in user authentication with the input of the temporary ID instead of the user authentication information comprising the first type of login information, and if the second user is already logged in based on the second temporary ID, the user authentication of the first user is made invalid and the second user is notified of the use of the temporary ID by the first user.

8. The image processor according to claim 2, wherein the image processor, in a case where the number of times of failures in user authentication with the temporary ID exceeds a prescribed number of times, is configured to render all temporary IDs invalid to delete the temporary IDs from the stored user authentication information.

9. The image processor according to claim 1, wherein the first or second use of the image processor comprises executing of a print job.

10. The image processor according to claim 9, wherein the print job comprises a secret job, and the image processor is configured to require a login to be performed at both the image processor and at a remote terminal in order to execute the secret job.

11. The image processor according to claim 1, wherein the image processor comprises a multiple function peripheral having at least one function selected from a group of copying function, scanning function, facsimileing function, and printing function.

12. An image processing method,
performed by an image processor comprising hardware, comprising steps of:
accepting an input of user authentication information comprising a first type of login information to login a first user to the image processor;
comparing the inputted user authentication information with stored user authentication information to thereby perform user authentication and to authorize first use of the image processor;
in response to the user authentication being successful, authorizing the first use of the image processor, automatically generating a temporary ID comprising a second type of login information, notifying the first user of the generated temporary ID and storing the generated temporary ID as related to the stored user authentication information;
accepting a logout to end the first use of the image processor;
after the generation of the temporary ID and the accepting of the logout to end the first use of the image processor, accepting an input of the temporary ID, instead of said user authentication information comprising the first type of login information, to login the first user to the image processor,
comparing the inputted temporary ID with the stored temporary ID to perform user authentication and to thereby authorize a second use of the image processor when the accepted temporary ID and the stored temporary ID match with each other, and
determining that a second temporary ID, matching the stored temporary ID and previously inputted by a second user to login to the image processor, is invalid when the first user succeeds in user authentication based on the user authentication information comprising the first type of login information instead of the temporary ID, wherein the determination that the inputted second temporary ID is invalid causes use of the image processor by the second user to be stopped and the second user to be forcibly logged out.

13. The image processing method according to claim 12, further comprising a step of determining effectiveness of the stored temporary ID.

14. The image processing method according to claim 12, wherein the first or second use of the image processor comprises executing a print job.

15. The image processing method according to claim 12, wherein the image processing method is performed by a multiple function peripherals peripheral having at least one function selected from a group of copying function, scanning function, printing function, and facsimileing function.

16. A non-transitory computer-readable recording medium that stores an image processing program for causing a computer to execute the steps of the image processing method according to claim 12.

17. The image processor according to claim 1, further comprising a hardware display unit configured to display a login screen comprising a first input area to accept the first type of login information and a second input area to accept the second type of login information.

18. The image processor according to claim 1, wherein the first type of login information comprises a user ID and a password.

19. The image processing method according to claim 12, further comprising a step of displaying a login screen comprising a first input area to accept the first type of login information and a second input area to accept the second type of login information.

20. The image processing method according to claim 12, wherein the first type of login information comprises a user ID and a password.

* * * * *